United States Patent [19]
Lee

[11] Patent Number: 6,005,789
[45] Date of Patent: Dec. 21, 1999

[54] CIRCUIT FOR INHIBITING TRANSITION PHENOMENON IN POWER SUPPLY UNIT

[75] Inventor: Ji-Young Lee, Suwon, Rep. of Korea

[73] Assignee: SamSung Electronics Co., Ltd., Suwon, Japan

[21] Appl. No.: 09/120,332

[22] Filed: Jul. 22, 1998

[30] Foreign Application Priority Data

Jul. 22, 1997 [KR] Rep. of Korea ..................... 97-34313

[51] Int. Cl.⁶ ........................ H02M 3/24; H02M 3/335; H01J 29/56
[52] U.S. Cl. ................. 363/95; 363/21; 315/387
[58] Field of Search ................. 363/95, 79, 21, 363/80, 97; 315/399, 378, 371, 387

[56] References Cited

U.S. PATENT DOCUMENTS

| | | | |
|---|---|---|---|
| 4,073,004 | 2/1978 | Chambers et al. | 363/79 |
| 4,156,273 | 5/1979 | Sato | 363/21 |
| 4,634,939 | 1/1987 | Dietz | 315/399 |
| 4,980,811 | 12/1990 | Suzuji et al. | 363/21 |
| 5,329,211 | 7/1994 | Sasaki et al. | 315/371 |
| 5,714,843 | 2/1998 | Youn | 315/378 |

*Primary Examiner*—Peter S. Wong
*Assistant Examiner*—Rajnikant B. Patel
*Attorney, Agent, or Firm*—Robert E. Bushnell, Esq.

[57] ABSTRACT

A circuit for inhibiting a transition phenomenon in a power supply unit is disclosed. When the power supply mode is shifted, a transition phenomenon is made not to appear in the operating power supplied to the load. The circuit includes a microcomputer which judges as to the presence or absence of horizontal and vertical synchronizing signals supplied from the computer system so as to vary the power in a stepwise form when shifting the power supply mode. In accordance with control signals of the microcomputer, a feedback level adjusting section reduces the error detected voltage in a stepwise form when the power is fed back from a second rectifying section through an error detecting section to a pulse width modulator (PWM) control section. Therefore, in accordance with the stepwisely decreasing error detected voltage, the pulse width modulator (PWM) control section reduces its output signals in a stepwise form, so that the power supplied to the load can be reduced in a stepwise form.

28 Claims, 5 Drawing Sheets

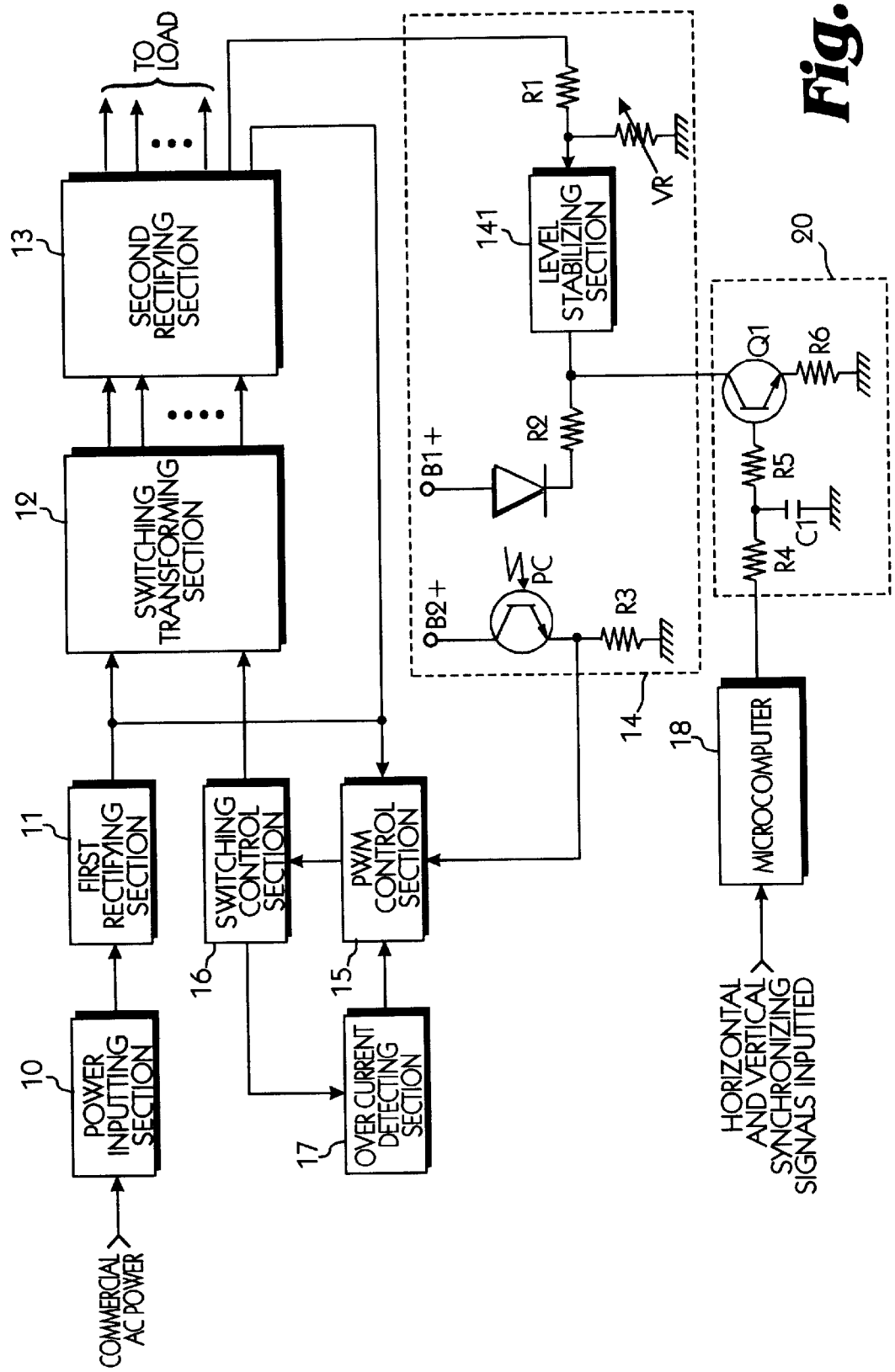

CIRCUIT FOR INHIBITING TRANSITION PHENOMENON IN POWER SUPPLY UNIT

CLAIM OF PRIORITY

This application makes reference to, incorporates the same herein, and claims all benefits accruing under 35 U.S.C. § 119 from an application entitled Circuit For Inhibiting Transition Phenomenon in Power Supply Unit earlier filed in the Korean Industrial Property Office on the 22th day of July 1998, and there duly assigned Serial No. P97-34313, a copy of which is annexed hereto.

BACKGROUND OF THE INVENTION

1. Technical Field

The present invention relates to an image displaying apparatus in which the operating power supplied to the load is controlled in accordance with the presence and absence of horizontal and vertical synchronizing signals in a computer system.

2. Related Art

An image displaying device such as a monitor using a cathode ray tube is a peripheral device which makes it possible for a user to check and monitor the operating state of a computer system connected to the monitor. In the computer system, signals for a current operation are outputted to the image display device, and the signals are displayed on the screen by the image display device. In order to display the computer signals on the screen of the cathode ray tube by the image display device, there are utilized horizontal and vertical synchronizing signals.

The image display device generates horizontal deflecting magnetic fields in accordance with the horizontal synchronizing signals, and generates vertical deflecting magnetic fields in accordance with the vertical synchronizing signals. Electron beams shot by an electron gun are deflected by the horizontal and vertical deflecting magnetic fields in accordance with the image signals. Thus a computer system outputs data signals as well as the horizontal and vertical synchronizing signals.

Video power savings for a monitor circuit are achieved in accordance with version 1.0 of the display power management signaling (DPMS) standard, dated Aug. 20, 1993, supported by the Video Electronics Standards Association (VESA). The Video Electronics Standards Association is an international non-profit corporation that supports and sets industry-wide interface standards for personal computer, workstation, and computing environments. Members of the Video Electronics Standards Association include hardware, software, personal computer, display and component manufacturers, cable and telephone companies, and service providers.

Power saving modes of the display power management signaling standard may be classified into a power-on mode, a standby mode, a suspend mode, and a power-off mode. The power saving mode of the display monitor is controlled by the horizontal and vertical synchronizing signals supplied from a host supporting the power savings modes. A personal computer may be the host.

If both types of synchronizing signals are supplied from the host, the display monitor apparatus is operated in the power-on mode. In the power-on mode, a high level of electrical power is supplied to the display monitor apparatus, such that full operational use of the display monitor apparatus is possible.

When only the vertical synchronizing signal is fed from the host, the power supply mode of the display monitor apparatus becomes the standby mode, in which a first group of circuits are put into a reduced power state. Standby mode can save approximately 30% of the power required for power-on mode and allows the display monitor apparatus to change to power-on mode instantly, as soon as needed.

When only the horizontal synchronizing signal is supplied from the host, the display apparatus is put into the suspend mode, in which a second group of circuits are put into a reduced power state. Suspend mode saves more power than standby mode by powering off the cathode ray tube's main heater but requires up to approximately 5 seconds to change to power-on mode.

When no synchronizing signals are provided from the host, the display monitor apparatus is put into the power-off mode. In such a case, electrical power supplied to the display monitor apparatus is changed to a low level, such that the screen of the display monitor apparatus is blank. Power-off mode saves more power by turning power off to everything except the monitor's microprocessor.

Thus, the aforementioned display power management signaling standard, proposed by the Video Electronics Standard Association, is capable of managing monitor power for a current mode and capable of reducing the power consumption.

The computer system utilizing the display power management signaling (DPMS) standard is capable of managing the power supplied to respective sections of the computer based on the state of the use of the computer system. The computer system selectively outputs horizontal and vertical synchronizing signals in accordance with the power supply mode in accordance with the display power management signaling (DPMS) standard. The monitor operates under an on-state mode, a standby mode, a suspend mode or a power-off mode in accordance with the presence or absence of the horizontal and vertical synchronizing signals.

That is, when both the horizontal and vertical synchronizing signals are outputted, the monitor operates under the on-state mode or power-on mode. When the vertical synchronizing signals are outputted and the horizontal synchronizing signals are not outputted, the monitor operates under the standby mode. When the horizontal synchronizing signals are outputted and the vertical synchronizing signals are not outputted, the monitor operates under the suspend mode. When neither the horizontal nor vertical synchronizing signals are outputted, the monitor operates under the power-off mode.

When the monitor operates under the on-state mode, the power consumption in accordance with the display power management signaling (DPMS) standard is about 80–100 watts (W). Under the standby mode, it is about 65 W or less. Under the suspend mode, it is about 25 W or less. Under the power-off mode, it is about 5 W or less.

Also, there are systems in which the on-state mode and the standby mode are merged into a normal mode, so that the managing mode can be divided into the normal mode, the suspend mode and the power-off mode. This type of three-mode power system is different from the aforementioned four-mode power system described in version 1.0 of the display power management signaling (DPMS) standard, dated Aug. 20, 1993, and supported by the Video Electronics Standards Association (VESA).

In the case of the three-mode power system, the power consumption is defined as follows. Under the normal mode, the power consumption is 80–100 W. Under the suspend mode, it is about 15 W or less. Under the power-off mode, it is about 5 W or less.

As described above, in the monitor in which the power is managed in accordance with the system operating mode, the power supply mode is shifted in accordance with the presence or absence of the horizontal and vertical synchronizing signals. Therefore, when the mode is shifted from the standby mode or the normal mode to the suspend mode, the operating power is greatly fluctuated.

Due to the fluctuations of the operating power, there occurs a transition phenomenon in which the operating power is severely lowered. Due to this transition phenomenon, the power which is supplied to the load is steeply decreased, and a surge current is supplied to the load. As a result, malfunctions occur, and the life expectancy of the power supply unit is shortened.

Meanwhile, in the case where the shifting is accompanied by a small power variation like when the on-state mode is shifted to the standby mode or the suspend mode is shifted to the power off mode, the transition phenomenon occurs, but in this case, the power fluctuation is low. Therefore, in this case, the apparatus is not much affected.

Accordingly, I have discovered that it would be desirable to provide an improved circuit reducing the aforementioned transition phenomenon and reducing the occurrence of damages associated with the transition phenomenon.

SUMMARY OF THE INVENTION

The present invention is intended to overcome the above described disadvantages. Therefore it is an object of the present invention to provide a circuit for inhibiting a transition phenomenon in a power supply unit, in which when shifting the power supply mode, the power is supplied to the load by being varied in a stepwise form, so that the transition phenomenon would not occur.

In achieving the above object and others, the present invention includes a microcomputer which judges as to the presence or absence of horizontal and vertical synchronizing signals supplied from the computer system so as to vary the power in a stepwise form when shifting the power supply mode.

In accordance with control signals of the microcomputer, a feedback level adjusting section reduces the error detected voltage in a stepwise form when the power is fed back from a second rectifying section through an error detecting section to a pulse width modulator (PWM) control section. Therefore, in accordance with the stepwisely decreasing error detected voltage, the pulse width modulator (PWM) control section reduces its output signals in a stepwise form, so that the power supplied to the load can be reduced in a stepwise form.

In achieving the above object and others, the present invention provides a power supply apparatus supplying stable power, the apparatus comprising: a switching transformer unit receiving a first power, switching the first power, and outputting a second power; a rectifying unit being coupled to said switching transformer unit, receiving the second power outputted from said switching transformer unit, converting the second power to a third power, and supplying the third power to a load, the third power corresponding to an operating power of the load; an error detecting unit being coupled to said rectifying unit, receiving from said rectifying unit a fourth power corresponding to the operating power, detecting errors in the fourth power, and outputting error control signals corresponding to the errors in the fourth power; a pulse width modulator being coupled to said error detecting unit and generating width modulated pulse signals in accordance with the error control signals received from said error detecting unit; a switching control unit being coupled to said pulse width modulator and controlling said switching transformer unit in accordance with the width modulated pulse signals received from said pulse width modulator; and a control unit detecting a power supply mode in accordance with horizontal and vertical synchronizing signals received from a computer system, and varying in a stepwise manner the error control signals conveyed from said error detecting unit to said pulse width modulator, the varying of the error control signals being in accordance with the detected power supply mode.

The present invention is more specifically described in the following paragraphs by reference to the drawings attached only by way of example.

BRIEF DESCRIPTION OF THE DRAWINGS

A more complete appreciation of the present invention, and many of the attendant advantages thereof will become readily apparent as the same becomes better understood by reference to the following detailed description when considered in conjunction with the accompanying drawings in which like reference symbols indicate the same or similar components, wherein:

FIG. 3 illustrates a power supply unit including the transition phenomenon inhibiting circuit, in accordance with the principles of the present invention;

DETAILED DESCRIPTION OF THE PREFERRED EMBODIMENTS

Figure 1:
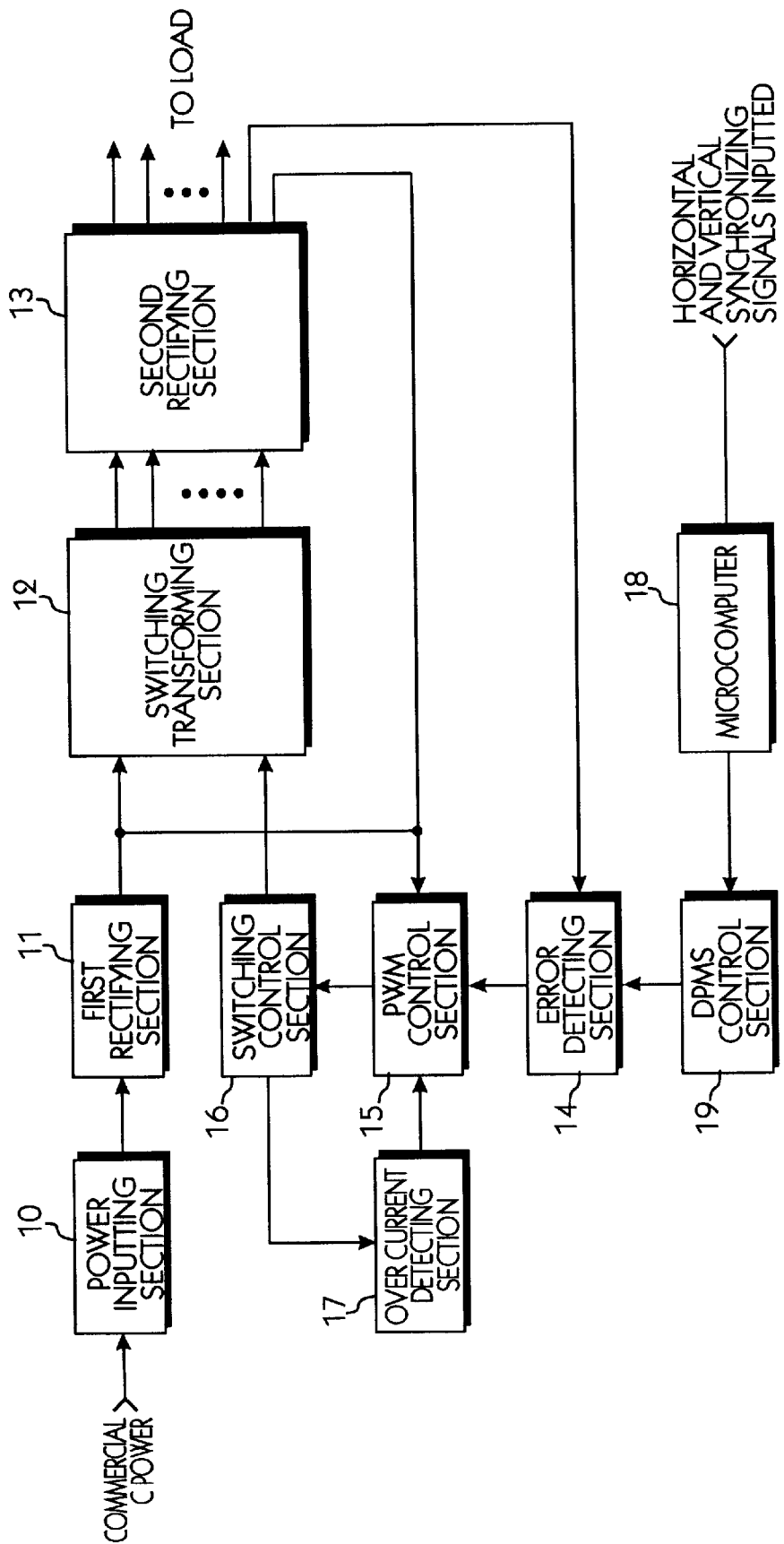
FIG. 1 illustrates a diagram showing a power supply unit.

In a monitor in which the power is managed in accordance with the system operating mode, the power supply mode is shifted in accordance with the presence or absence of the horizontal and vertical synchronizing signals. Therefore, when the mode is shifted from the standby mode or the normal mode to the suspend mode, the operating power is greatly fluctuated. The technique of shifting power supply modes in accordance with the presence or absence of the horizontal and vertical synchronizing signals shall be described in detail referring to the drawings. Corresponding elements in all of the figures have been assigned corresponding reference numerals.

Turn now to FIG. 1, which illustrates a diagram showing a power supply unit. FIG. 1 is a block diagram showing the constitution of the power supply unit. As shown in FIG. 1, the power supply unit includes: a power inputting section 10 for inputting an alternating current (AC) power; a first rectifying section 11 for converting the alternating current (AC) power of the power inputting section 10 to a direct current (DC) power; a switching transforming section 12 for switching the output power of the first rectifying section 11; a second rectifying section 13 for rectifying the output power of the switching transforming section to an operating power to supply it to a load; an error detecting section 14 for detecting the levels of the operating power of the second rectifying section 13; a pulse width modulator (PWM) control section 15 for generating pulse width modulator (PWM) signals in accordance with the detected signals of the error detecting section 14; a switching control section 16 for switching the switching transforming section 12 by being activated by the pulse width modulator (PWM) signals of the pulse width modulator (PWM) control section 15; an over current detecting section 17 for detecting as to whether an over current flows into the switching control section 16, so as to feedback it into the pulse width modulator (PWM) control section 15; a microcomputer 18 for controlling the power supply to the load in accordance with the presence or absence of the horizontal and vertical synchronizing signals; and a display power management signaling (DPMS) control section 19 for outputting power supply mode control signals under the control of the microcomputer 18, so as to adjust the feedback level of the error detecting section 14.

In this power supply unit, the commercial alternating current (AC) power which is inputted by the power inputting section 10 is rectified and flattened by the first rectifying section 11 to generate a direct current (DC) power. The direct current (DC) power of the first rectifying section 11 is supplied to the switching transforming section 12 and to the pulse width modulator (PWM) control section 15 as an initial operating power.

Then the pulse width modulator (PWM) control section 15 outputs pulse width modulator (PWM) signals of a certain width to supply them to the switching control section 16. The switching transforming section 12 generally consists of a transformer, while the switching control section 16 consists of a switching transistor. Thus the switching control section 16 is repeatedly turned on and off in accordance with the pulse width modulator (PWM) signals of the pulse width modulator (PWM) control section 15. The switching transforming section 12 switches the output of the first rectifying section 11 in accordance with the operation of the switching section 16.

The output power of the switching transforming section 12 is converted again to a direct current (DC) power by the second rectifying section 13. Then the direct current (DC) power is supplied to the load as an operating power. Further, the output power of the second rectifying section 13 is also supplied to the pulse width modulator (PWM) control section 15 and to the error detecting section 14 as the operating power.

The error detecting section 14 judges as to whether there are over-powers in the output of the second rectifying section 13. The judged result is outputted to the pulse width modulator (PWM) control section 15. Then the pulse width modulator (PWM) control section 15 outputs width-varying pulse width modulator (PWM) signals in accordance with the output of the error detecting section 14.

That is, if an over-power which is higher than the predetermined level is supplied from the second rectifying section 13 to the load, then the pulse width modulator (PWM) control section 15 outputs a narrow width pulse signal. If a power which is lower than the predetermined level is supplied, the pulse width modulator (PWM) control section outputs a wide width pulse signal.

Thus the switching control section 16 operates in accordance with the width varying pulse width modulator (PWM) signals of the pulse width modulator (PWM) control section 15. Thus the switching operation of the switching transforming section 12 is controlled, and consequently, a stable power is supplied to the load proportionally to the power consumption.

Further, the over current detecting section 17 detects as to whether an over current flows into the switching control section 16. If an over current flows, the operation of the pulse width modulator (PWM) control section 15 is stopped, so that the switching control section 15 would not be damaged.

Meanwhile, the microcomputer 18 judges as to whether the horizontal and vertical synchronizing signals are inputted from the computer system, and supplies control signals for the power supply. In accordance with the power supply control signals of the microcomputer 18, the DPMS control section 19 outputs power supply mode control signals.

In accordance with the power supply mode control signals of the DPMS control section 19, the level of the voltage which is supplied from the error detecting section 14 to the pulse width modulator (PWM) control section 15 is varied, while a power corresponding to the power supply mode is supplied to the load.

However, in the above described technique, when the power supply mode is shifted, the power which is supplied to the load is adjusted directly in accordance with the output signals of the microcomputer 18. Therefore, when the mode is shifted from the standby mode or the normal mode to the suspend mode, the operating power is greatly fluctuated.

Figure 2:
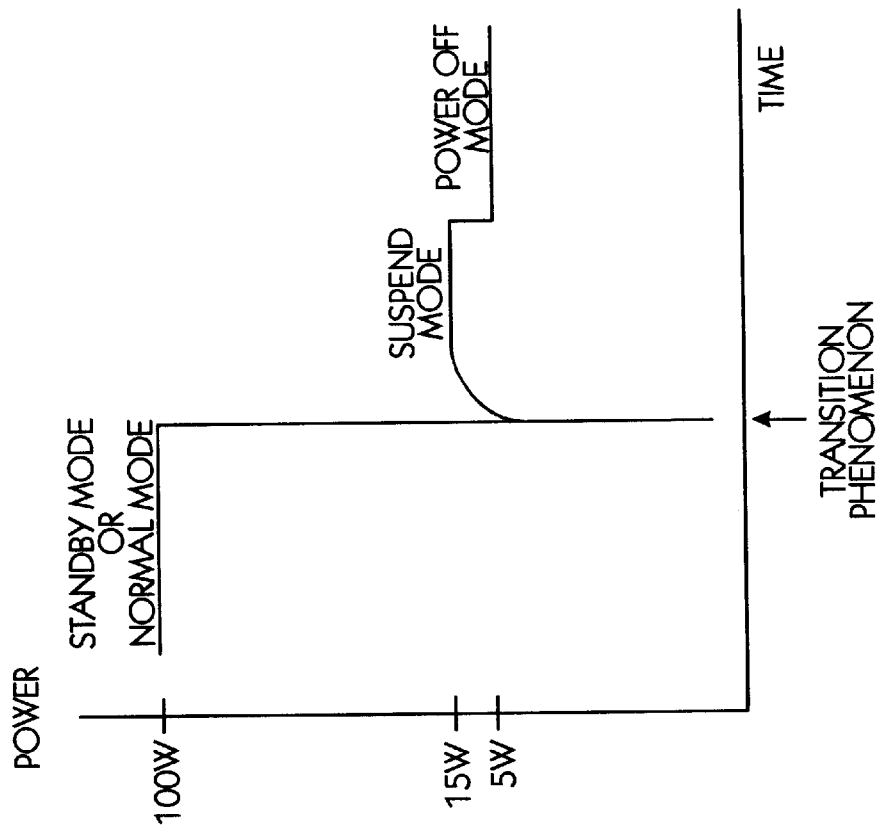
FIG. 2 illustrates a wave pattern during the shifting of a power supply mode in the power supply unit of FIG. 1.

Turn now to FIG. 2, which illustrates a wave pattern during the shifting of a power supply mode in the power supply unit of FIG. 1. The wave pattern shown in FIG. 2 shows that the operating power fluctuates greatly when the mode is shifted from the standby mode or the normal mode to the suspend mode.

Due to the fluctuations of the operating power, there occurs a transition phenomenon in which the operating power is severely lowered. Due to this transition phenomenon, the power which is supplied to the load is steeply decreased, and a surge current is supplied to the load. As a result, malfunctions occur, and the life expectancy of the power supply unit is shortened.

Meanwhile, in the case where the shifting is accompanied by a small power variation like when the on-state mode is shifted to the standby mode or the suspend mode is shifted to the power off mode, the transition phenomenon occurs, but in this case, the power fluctuation is low. Therefore, this case, the apparatus is not much affected.

The transition phenomenon inhibiting circuit of the power supply unit according to the present invention will be described in detail referring to FIGS. 3 and 4. Refer now to FIG. 3, which illustrates a power supply unit including the transition phenomenon inhibiting circuit, in accordance with the principles of the present invention.

FIG. 3 is a illustration showing a power supply unit including the transition phenomenon inhibiting circuit according to the present invention. An error detecting section 14 includes a resistor R1 and a variable resistor VR which are serially connected to a second rectifying section 13 to divide the output of the second rectifying section 13. A connection point between the resistor R1 and the variable resistor VR is connected to an input terminal of a level stabilizing section 141. The level stabilizing section 141 consists of a chip No. KA431/A, and compares the input voltage with a reference voltage to output a stabilized power.

An output terminal of the level stabilizing section 141 is connected through a resistor R2 to a cathode of a light emitting device of a photo-coupler PC which is a current converting means. A power source B1+ is connected to an anode of the light emitting device of the photo-coupler. A power source B2+ is supplied to a collector of a light receiving device of the photo-coupler PC. A resistor R3 is connected to an emitter of a light receiving device of the photocoupler PC. A connection point of the resistor R3 is connected to an input terminal of a pulse width modulator (PWM) control section 15.

Reference numeral 20 indicates a feedback level adjusting section which adjusts the error detected voltage level which is supplied from the error detecting section 14 to the pulse width modulator (PWM) control section 15. The feedback level adjusting section 20 includes a resistor R4 and a capacitor C1. An output terminal of a microcomputer 18 is connected through the resistor R4 to a terminal of the capacitor C1, while another terminal of the capacitor C1 is grounded.

A connection point between the resistor R4 and the capacitor C1 is connected through a resistor R5 to a base of a transistor Q1. An emitter of the transistor Q1 is grounded through a resistor R6, while a collector of the transistor Q1 is connected to a connection point between an output terminal of the level stabilizing section 141 and the resistor R2. In the present invention constituted as described above, the second rectifying section 13 supplies the operating power to the load, and the powers B1+ and B2+ are supplied to the error detecting section 14. In this state, the output voltage of the second rectifying section 13 is divided by the resistor R1 and the variable resistor VR so as to be inputted into the level stabilizing section 141.

The level stabilizing section 141 compares the inputted voltage with a reference voltage, amplifies it and stabilizes it. The output voltage of the level stabilizing section 141 is supplied through the resistor R2 to the cathode of the light emitting device of the photo-coupler PC. Then in the light emitting device of the photo-coupler PC, there flows a current correspondingly with the output voltage of the level stabilizing section 141, so as to output optical beams.

For example, if the output voltage of the level stabilizing section 141 is low, a large amount of current flows through the light emitting device of the photo-coupler, with the result that a large amount of optical beams is outputted. If the result output voltage of the level stabilizing section 141 is high, a small amount of current flows through the light emitting device, with the result that a small amount of optical beams is outputted.

The output beams of the light emitting device are received by the light receiving device, so that a current proportional to the received optical beams flows to its emitter. The electric current which is outputted by the photocoupler PC is converted into a voltage by the resistor R3, and the voltage is inputted into the pulse width modulator (PWM) control section 15.

Then the pulse width modulator (PWM) control section 15 judges the power level based on the voltage which is fed back through error detecting section 14. Based on the result of the judgment, width variable pulse width modulator (PWM) signals are outputted, so that the second rectifying section 13 can supply a stable operating power to the load.

Figure 4:
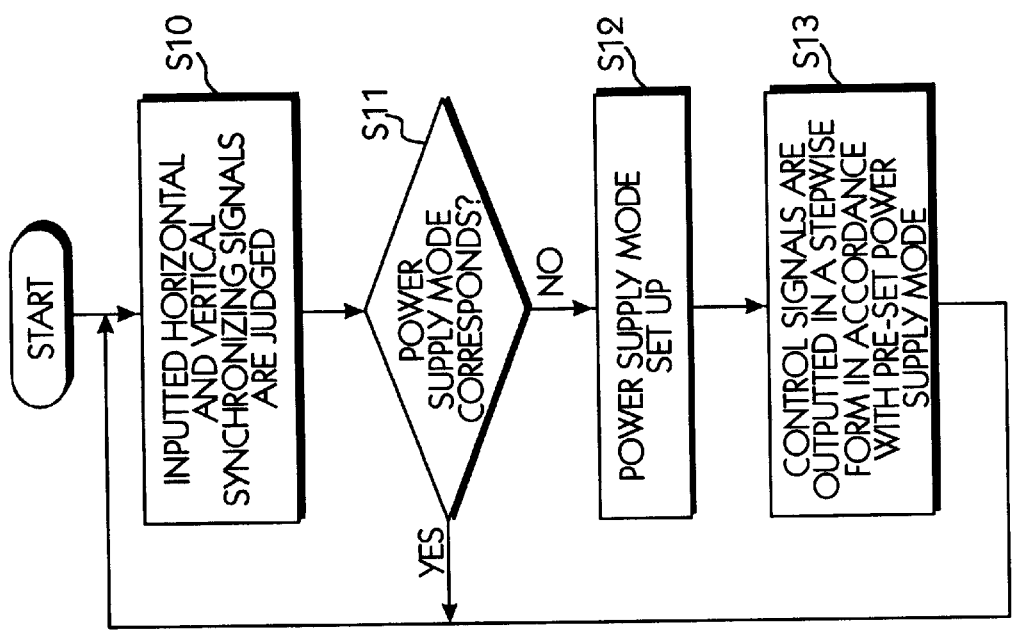
FIG. 4 illustrates a flowchart of the operation of the microcomputer depicted in FIG. 3, in accordance with the principles of the present invention.

With a continued reference to FIG. 3 corresponding to a continuation of the description immediately above, refer now to FIG. 4, which illustrates a flowchart of the operation of the microcomputer depicted in FIG. 3, in accordance with the principles of the present invention. At step S10 of FIG. 4, the microcomputer 18 judges as to whether horizontal and vertical synchronizing signals are inputted from the computer system. At step S11, the microcomputer 18 further judges as to whether horizontal and vertical synchronizing signals correspond to the power supply mode in which the operating power is supplied to the current load).

If the horizontal and vertical synchronizing signals correspond to the power supply mode, and thus the response to step S11 is YES, the microcomputer 18 returns to the step S10 at which the microcomputer 18 repeats the judgments on the horizontal and vertical synchronizing signals.

If the horizontal and vertical synchronizing signals do not correspond to the power supply mode, and thus the response to step S11 is NO, the step S12 is perfomed. At step S12, a power supply mode is set up correspondingly with the judged horizontal and vertical synchronizing signals.

For example, if both the horizontal and vertical synchronizing signals are inputted, the on-state mode is set up. If not the horizontal synchronizing signals but only the vertical synchronizing signals are inputted, the standby mode is set up. If not the vertical but only horizontal synchronizing signals are inputted, the suspend mode is set up. If neither the horizontal nor vertical synchronizing signals are inputted, the power-off mode is set up.

At step S13, control signals corresponding to the power supply mode thus set up are outputted after varying them in a stepwise form, and then the system returns to the step S10. That is, the microcomputer 18 of FIG. 3 includes a digital-to-analog converter which converts the control signals (corresponding to the power supply mode) to analog signals. The stepwisely varying control signals of the microcomputer 18 are supplied through the resistor R4 of the feedback level adjusting section 20 to be charged into the capacitor C1 so as to be stabilized.

The control signals thus stabilized by the capacitor C1 are supplied through the resistor R5 to the base of the transistor Q1. In accordance with these control signals, the bias voltage of the transistor Q1 is varied. Then in accordance with the levels of the control signals, the current flowing through the collector of the transistor Q1 is varied.

Owing to the variation of the current flowing through the transistor Q1, the current flowing through the light emitting device of the photo-coupler PC is varied, with the result that the outputted optical beam amount is varied. Therefore, the level of the error detected voltage which flows from the photo-coupler PC to the pulse width modulator (PWM) control section 15 is varied.

The pulse width modulator (PWM) control section 15 outputs pulse width modulator (PWM) signals having a width corresponding to the power supply mode of the control signals of the microcomputer 18. Thus the load operating power which is outputted from the second rectifying section 13 is adjusted suitably to the power supply mode.

For example, if the power supply mode is to be shifted from the standby mode or the normal mode to the suspend mode, the level of the control signals of the microcomputer 18 is varied in a stepwise form. Owing to this, the load operating power from the second rectifying section 13 is varied in a stepwise form, with the result being that the aforementioned transition phenomenon does not occur.

Figure 5:
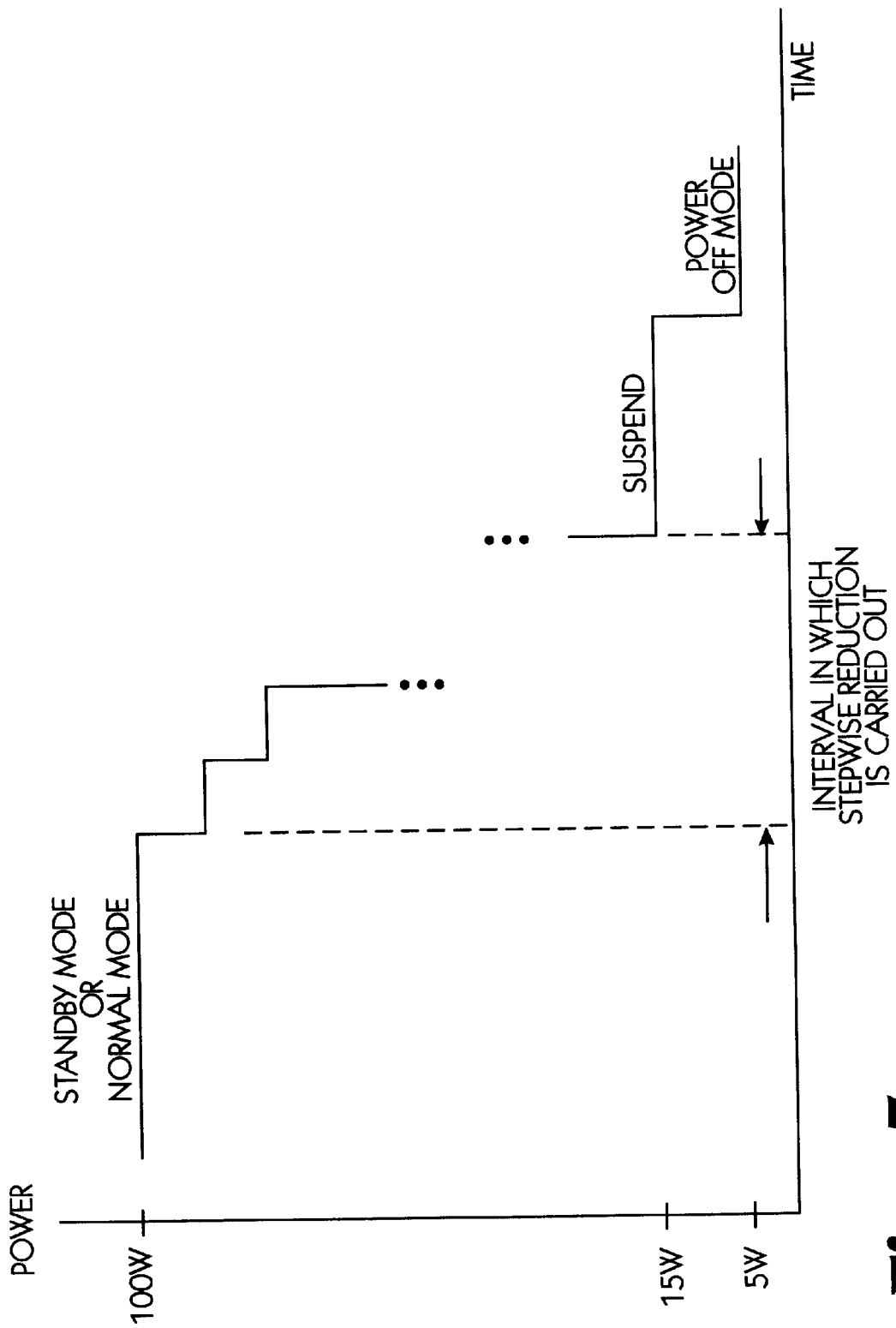
FIG. 5 illustrates a wave pattern showing the inhibition of the transition phenomenon by the transition phenomenon inhibiting circuit of the power supply unit of FIG. 3 during a shifting of the power supply mode, in accordance with the principles of the present invention.

Refer now to FIG. 5, which illustrates a wave pattern showing the inhibition of the transition phenomenon by the transition phenomenon inhibiting circuit of the power supply unit of FIG. 3 during a shifting of the power supply mode, in accordance with the principles of the present invention. FIG. 5 shows that the load operating power from the second rectifying section 13 is varied in stepwise form, with the result being that the aforementioned transition phenomenon does not occur.

Figure 6:
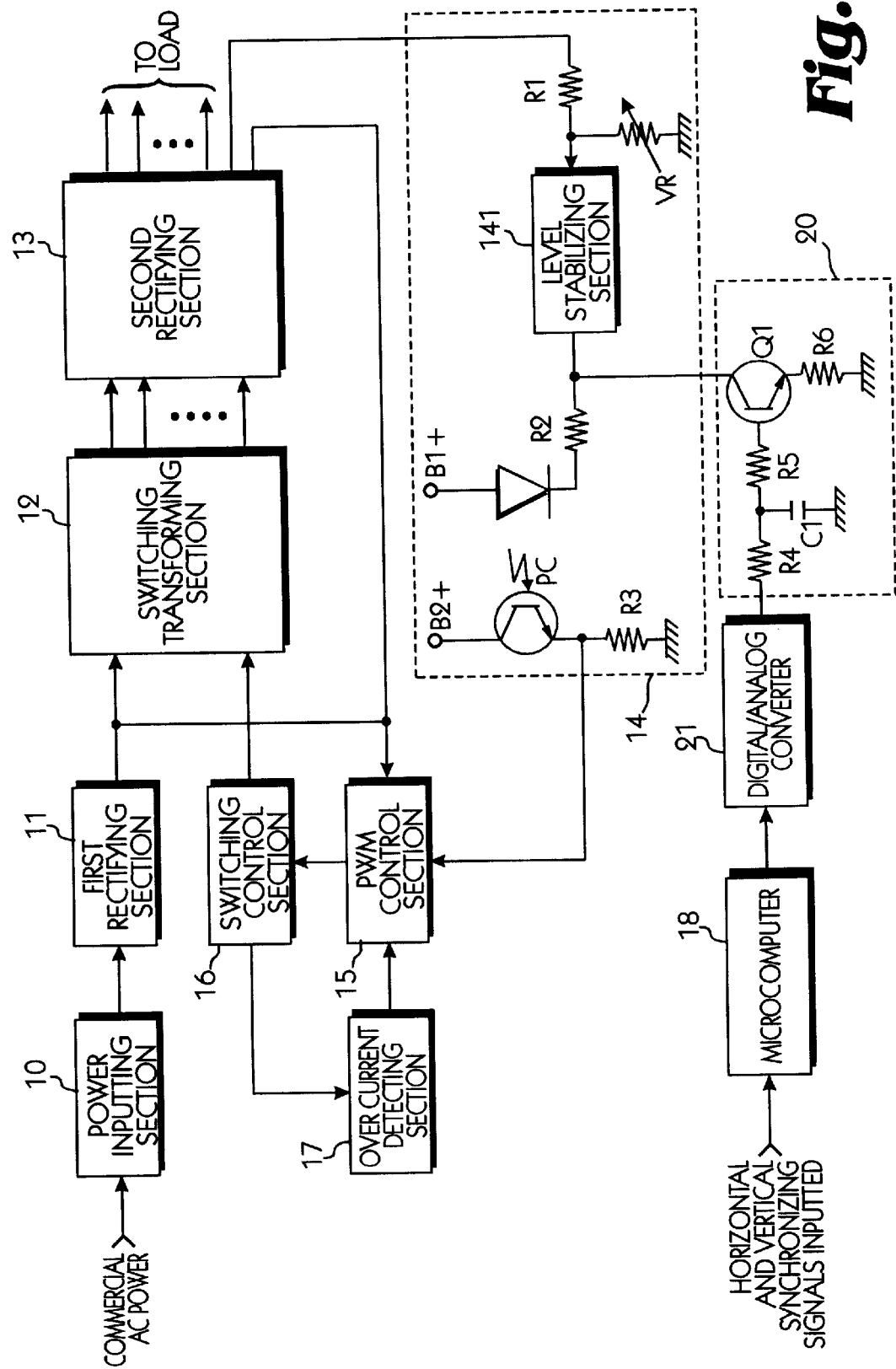
FIG. 6 illustrates another embodiment of a power supply unit including the transition phenomenon inhibiting circuit, in accordance with the principles of the present invention.

Turn now to FIG. 6, which illustrates another embodiment of a power supply unit including the transition phenomenon inhibiting circuit, in accordance with the principles of the present invention. As shown in FIG. 6, a digital-to-analog converter 21 is disposed between the microcomputer 18 and the feedback level adjusting section 20.

In FIG. 6, the microcomputer 18 does not include a digital-to-analog converter, but outputs the control signals in a digital form. The digital control signals of the microcomputer 18 are converted to analog signals by the digital-to-analog converter. The output signals of the digital-to-analog converter 21 are supplied through the resistor R4 of the feedback level adjusting section 20 to be charged into the capacitor C1 so as to be stabilized. Then the signals are supplied through the resistor R5 to the base of the transistor Q1.

Therefore, in accordance with the output signals of the microcomputer 18, the collector current of the transistor Q1 is varied. Then the level of the error detected voltage which is fed back from the error detecting section 14 to the pulse width modulator (PWM) control section 15 is varied, with the result that a power corresponding to the power supply mode is supplied to the load.

In the above, the case where the power supply mode is shifted from the standby mode or the normal mode to the suspend mode was described. The microcomputer 18 can be made to vary the control signals in a stepwise form only in this case. Or the microcomputer 18 can be made to vary the control signals in a stepwise form in all cases of power level shifting.

According to the present invention as described above, when the power supply mode is shifted, the power supplied to the load is made to be varied in a stepwise form, so that the transition phenomenon would not occur, and that a stable power can be supplied.

The foregoing paragraphs describe the details of an image displaying apparatus in which the operating power supplied to the load is controlled in accordance with the presence and absence of horizontal and vertical synchronizing signals in a computer system. The foregoing paragraphs also describe the details of a circuit for inhibiting a transition phenomenon in a power supply unit, in which when the power supply mode is shifted, a transition phenomenon is made not to appear in the operating power supplied to the load.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A power supply apparatus providing stable power, the apparatus comprising:
    a switching transformer unit receiving a first power, switching the first power, and outputting a second power;
    a rectifying unit being coupled to said switching transformer unit, receiving the second power outputted from said switching transformer unit, converting the second power to a third power, and supplying the third power to a load, the third power corresponding to an operating power of the load;
    an error detecting unit being coupled to said rectifying unit, receiving from said rectifying unit a fourth power corresponding to the operating power, detecting errors in the fourth power, and outputting error control signals corresponding to the errors in the fourth power;
    a pulse width modulator being coupled to said error detecting unit and generating width modulated pulse signals in accordance with the error control signals received from said error detecting unit;
    a switching control unit being coupled to said pulse width modulator and controlling said switching transformer unit in accordance with the width modulated pulse signals received from said pulse width modulator; and
    a reference control unit detecting a power supply mode from among at least a first mode and a second mode in accordance with horizontal and vertical synchronizing signals received from a computer system, and varying in a stepwise manner the error control signals conveyed from said error detecting unit to said pulse width modulator, the varying of the error control signals being in accordance with the detected power supply mode;
    said reference control unit further comprising:
        a microcomputer detecting the power supply mode in accordance with the horizontal and vertical synchronizing signals received from the computer system, and varying in a stepwise manner digital microcomputer control signals outputted from said microcomputer, the varying of the digital microcomputer control signals being in accordance with the detected power supply mode;
        a digital-to-analog converter unit receiving the digital microcomputer control signals from said microcomputer, converting the received digital microcomputer control signals to analog microcomputer control signals, and outputting the analog microcomputer control signals; and
        an adjusting unit being coupled to said digital-to-analog converter unit and to said error detecting unit, receiving the analog microcomputer control signals from said digital-to-analog converter unit, varying the error control signals conveyed from said error detecting unit to said pulse width modulator, the varying of the error control signals being in a stepwise manner and corresponding to the analog microcomputer control signals received from said digital-to-analog converter unit, the stepwise varying of the error control signals inhibiting a transition phenomenon when the detected power supply mode is shifted from one of said first and second modes to another of said first and second modes.

2. The apparatus of claim 1, further comprising:
    an overcurrent detector being coupled to said switching control unit and said pulse width modulator, said overcurrent detector detecting when an overcurrent flows to said switching control unit and conveying data to said pulse width modulator corresponding to the overcurrent detected;
    said error detecting unit further comprising:
        a current converting unit being coupled to said pulse width modulator, generating an electric current corresponding to the error control signals transmitted from said error detecting unit to said pulse width modulator, said current converting unit including a light emitting unit being supplied with a primary power and light receiving unit being supplied with a secondary power.

3. The apparatus of claim 2, wherein the first power corresponds to an alternating current power.

4. The apparatus of claim 2, wherein the third power corresponds to a direct current power.

5. The apparatus of claim 2, wherein the power supply mode corresponds to a power level selected from among a power-on power level, a standby power level lower than said power-on power level, a suspend power level lower than said standby power level, and a power-off power level lower than said suspend power level.

6. The apparatus of claim 2, wherein the power supply mode corresponds to a power level selected from among a normal power level, a suspend power level lower than said normal power level, and a power-off power level lower than said suspend power level.

7. The apparatus of claim 2, wherein said error detecting unit further comprises:
 a voltage dividing unit dividing a voltage of the fourth power received from said rectifying unit into a first voltage and a second voltage;
 a stabilizing unit coupled to said voltage dividing unit, receiving the first voltage from said voltage dividing unit, stabilizing the first voltage, and outputting a stabilized signal; and
 a current converting unit coupled to said stabilizing unit, receiving the stabilized signal, and generating an electrical current in accordance with the stabilized signal.

8. The apparatus of claim 2, said power supply mode detected by said reference control unit being selected from among the first mode, the second mode, a third mode, and a fourth mode.

9. The apparatus of claim 8, the stepwise varying of the error control signals performed by said adjusting unit inhibiting the transition phenomenon when the detected power supply mode is shifted from any one of said first, second, third, and fourth modes to any other one of said first, second, third, and fourth modes.

10. An apparatus inhibiting a transition phenomenon in a power supply device, the apparatus comprising:
 a switching transformer unit receiving a first power from a first power source, modifying the first power, and outputting a second power to a load, the second power corresponding to an operating power of the load;
 an error detecting unit being coupled to said switching transformer unit, receiving from said switching transformer unit a third power corresponding to the operating power, detecting errors in the third power, and outputting error control signals corresponding to the errors in the third power;
 a pulse width modulator being coupled to said error detecting unit and generating width modulated pulse signals in accordance with the error control signals received from said error detecting unit;
 a switching control unit being coupled to said pulse width modulator and controlling said switching transformer unit in accordance with the width modulated pulse signals received from said pulse width modulator; and
 an adjusting unit detecting a power supply mode from among at least a first mode and a second mode in accordance with horizontal and vertical synchronizing signals received from a computer system, and varying in a stepwise manner the error control signals conveyed from said error detecting unit to said pulse width modulator, the varying of the error control signals being in accordance with the detected power supply mode;

said error detecting unit further comprising:
 a voltage dividing unit dividing a voltage of the third power received from said switching transformer unit into a first voltage and a second voltage;
 a stabilizing unit having a first terminal and a second terminal, said first terminal of said stabilizing unit being coupled to said voltage dividing unit and receiving the first voltage from said voltage dividing unit, said stabilizing unit stabilizing the first voltage, and outputting a stabilized signal; and
 a current converting unit coupled to said second terminal of said stabilizing unit, receiving the stabilized signal from said stabilizing unit and generating an electrical current in accordance with the stabilized signal;

said adjusting unit further comprising:
 a microcomputer detecting the power supply mode in accordance with the horizontal and vertical synchronizing signals received from the computer system, and varying in a stepwise manner digital microcomputer control signals outputted from said microcomputer, the varying of the digital microcomputer control signals being in accordance with the detected power supply mode;
 a digital-to-analog converter unit receiving the digital microcomputer control signals from said microcomputer, converting the received digital microcomputer control signals to analog microcomputer control signals, and outputting the analog microcomputer control signals; and
 a modifying unit being coupled to said digital-to-analog converter unit and to said error detecting unit, receiving the analog microcomputer control signals from said digital-to-analog converter unit, varying the error control signals conveyed from said error detecting unit to said pulse width modulator, the varying of the error control signals being in a stepwise manner and corresponding to the analog microcomputer control signals received from said digital-to-analog converter unit, the stepwise varying of the error control signals inhibiting a transition phenomenon when the detected power supply mode is shifted from any one of said first and second modes to any other one of said first and second modes.

11. The apparatus of claim 10, further comprising:
an overcurrent detector being coupled to said switching control unit and said pulse width modulator, said overcurrent detector detecting when an overcurrent flows to said switching control unit and conveying data to said pulse width modulator corresponding to the overcurrent detected;

said current converting unit including a light emitting unit being supplied with a primary power and light receiving unit being supplied with a secondary power, the electrical current generated by said current converting unit corresponding to the error control signals transmitted from said error detecting unit to said pulse width modulator.

12. The apparatus of claim 11, wherein the first power corresponds to an alternating current power.

13. The apparatus of claim 11, wherein the second power corresponds to a direct current power.

14. The apparatus of claim 11, wherein the power supply mode corresponds to a power level selected from among a power-on power level, a standby power level, a suspend power level, and a power-off power level.

15. The apparatus of claim 11, wherein the power supply mode corresponds to a power level selected from among a normal power level, a suspend power level, and a power-off power level.

16. The apparatus of claim 11, said power supply mode detected by said adjusting unit being selected from among the first mode, the second mode, a third mode, and a fourth mode.

17. The apparatus of claim 16, the stepwise varying of the error control signals performed by said modifying unit inhibiting the transition phenomenon when the detected power supply mode is shifted from any one of said first, second, third, and fourth modes to any other one of said first, second, third, and fourth modes.

18. The apparatus of claim 11, said light emitting unit further comprising:
- a first resistor having a first terminal and a second terminal, said first terminal of said first resistor being coupled to said stabilizing unit and receiving the stabilized signal from said stabilizing unit; and
- a diode emitting light and having a cathode and an anode, said cathode being coupled to said second terminal of said first resistor, said anode being coupled to a primary power source and receiving the primary power from the primary power source.

19. The apparatus of claim 10, wherein said current converting unit corresponds to a light sensor unit.

20. The apparatus of claim 10, wherein said current converting unit further comprises:
- a light emitting unit emitting light, said light emitting unit being coupled to said stabilizing unit; and
- a light sensing unit sensing light emitted from said light emitting unit, said light sensing unit being coupled to said pulse width modulator.

21. The apparatus of claim 20, wherein said light emitting unit further comprises:
- a first resistor having a first terminal and a second terminal, said first terminal of said first resistor being coupled to said stabilizing unit and receiving the stabilized signal from said stabilizing unit; and
- a diode emitting light and having a cathode and an anode, said cathode being coupled to said second terminal of said first resistor, said anode being coupled to a second power source and receiving power from the second power source.

22. The apparatus of claim 21, wherein said light sensing unit further comprises:
- a transistor having a control electrode receiving light emitted from said diode, a first electrode of a principal electrically conducting channel receiving power from a third power source, and a second electrode of the principal electrically conducting channel;
- a second resistor having a first terminal and a second terminal, said first terminal of said second resistor being coupled to said second electrode of said transistor, and said second terminal of said second resistor being coupled to a reference potential; and
- said first terminal of said second resistor being coupled to said pulse width modulator and conveying the error control signals to said pulse width modulator.

23. The apparatus of claim 10, wherein said modifying unit further comprises:
- a transistor having a control electrode, a first electrode of a principal electrically conducting channel coupled to said second terminal of said stabilizing unit, and a second electrode of the principal electrically conducting channel;
- a first resistor having a first terminal and a second terminal, said first terminal of said first resistor being coupled to said second electrode of said transistor, and said second terminal of said first resistor being coupled to a reference potential;
- a second resistor having a first terminal and a second terminal, said first terminal of said second resistor being coupled to said control electrode of said transistor; and
- a third resistor having a first terminal, and a second terminal, said first terminal of said third resistor being coupled to said second terminal of said second resistor, and said second terminal of said third resistor being coupled to said output terminal of said microcomputer.

24. A method of supplying stable power, the method comprising the steps of:
- supplying a first level of power from a power supply unit to a load;
- detecting horizontal and vertical synchronizing signals received from a computer system, said detecting step being performed by a signal detecting unit coupled to the computer system, said signal detecting unit being coupled to said power supply unit;
- determining when the horizontal and vertical synchronizing signals received from the computer system correspond to the first level of power being supplied to the load;
- when the horizontal and vertical synchronizing signals received from the computer system correspond to the first level of power being supplied to the load, returning to said detecting step;
- when the horizontal and vertical synchronizing signals received from the computer system correspond to a second level of power and do not correspond to the first level of power being supplied to the load, outputting control signals in a stepwise manner from said signal detecting unit to said power supply unit, said control signals being in accordance with the second level of power, and said control signals corresponding to the horizontal and vertical synchronizing signals received from the computer system;
- converting a level of power supplied to the load from the first level of power to the second level of power in an incremental manner corresponding to the stepwise manner in which said control signals were outputted, said converting inhibiting a transition phenomenon; and
- supplying the second level of power from said power supply unit to the load.

25. The method of claim 24, further comprising:
- a switching transformer unit receiving a first power, switching the first power, and outputting a second power;
- a rectifying unit being coupled to said switching transformer unit, receiving the second power outputted from said switching transformer unit, converting the second power to a third power, and supplying the third power to a load, the third power corresponding to an operating power of the load, and the third power corresponding to said first level of power;

an error detecting unit being coupled to said rectifying unit, receiving from said rectifying unit a fourth power corresponding to the operating power, detecting errors in the fourth power, and outputting error control signals corresponding to the errors in the fourth power;

a pulse width modulator being coupled to said error detecting unit and generating width modulated pulse signals in accordance with the error control signals received from said error detecting unit; and a switching control unit being coupled to said pulse width modulator and controlling said switching transformer unit in accordance with the width modulated pulse signals received from said pulse width modulator.

26. The method of claim 25, wherein the first power corresponds to an alternating current power.

27. The method of claim 25, wherein the third power corresponds to a direct current power.

28. The method of claim 25, wherein said error detecting unit further comprises:

a voltage dividing unit dividing a voltage of the fourth power received from said rectifying unit into a first voltage and a second voltage;

a stabilizing unit coupled to said voltage dividing unit, receiving the first voltage from said voltage dividing unit, stabilizing the first voltage, and outputting a stabilized signal; and a current converting unit coupled to said stabilizing unit, receiving the stabilized signal, and generating an electrical current in accordance with the stabilized signal.

* * * * *